United States Patent [19]

Fritz

[11] Patent Number: 5,506,900
[45] Date of Patent: Apr. 9, 1996

[54] TEMPERATURE COMPENSATION FOR TRANS-HYBRID LOSS IN A MINIATURIZED DATA ACCESS ARRANGEMENT

[75] Inventor: Scott N. Fritz, Penn Valley, Calif.

[73] Assignee: Silicon Systems, Inc., Tustin, Calif.

[21] Appl. No.: 395,485

[22] Filed: Feb. 27, 1995

Related U.S. Application Data

[63] Continuation of Ser. No. 18,730, Feb. 17, 1993, abandoned.

[51] Int. Cl.⁶ .................................................. H04M 1/76
[52] U.S. Cl. .......................... 379/402; 379/345; 379/403; 379/404; 379/399; 379/398
[58] Field of Search ................................. 379/345, 342, 379/344, 402, 403, 404, 399, 398, 349, 340, 107, 66; 29/612

[56] References Cited

U.S. PATENT DOCUMENTS

| | | | |
|---|---|---|---|
| 3,617,655 | 11/1971 | Fischer | 379/345 |
| 4,056,719 | 11/1977 | Waaben | 379/344 X |
| 4,484,032 | 11/1984 | Rosenbaum | 379/345 |
| 4,503,289 | 3/1985 | Spires | 379/345 |
| 4,523,307 | 6/1985 | Brown et al. | 379/66 |
| 4,555,599 | 11/1985 | Hackett-Jones et al. | 379/345 |
| 4,804,957 | 2/1989 | Selph et al. | 379/107 X |
| 4,922,531 | 5/1990 | Moisin | 379/402 |
| 4,982,426 | 1/1991 | Jakab | 379/402 |
| 5,014,305 | 5/1991 | Moisin | 379/402 |
| 5,119,538 | 6/1992 | White et al. | 29/612 |
| 5,245,654 | 9/1993 | Wilkinson et al. | 379/345 |
| 5,255,317 | 10/1993 | Arai et al. | 379/402 |
| 5,274,704 | 12/1993 | Jakab | 379/402 |

Primary Examiner—Jeffery Hofsass
Assistant Examiner—Scott Wolinsky
Attorney, Agent, or Firm—Hecker & Harriman

[57] ABSTRACT

Method and apparatus for temperature compensation of transhybrid loss in a data access arrangement (DAA) is provided. A thermal compensation device is situated in proximity to a thermally sensitive device. If devices which dissipate substantial power cause heating of the thermally sensitive device and change its characteristics, the thermal compensation device is also heated and compensates for the changes. Thus, a DAA that is unaffected by temperature changes and self-heating is provided. The DAA is suitable for use with data communications equipment utilizing echo cancelling circuitry, such as CCITT V.32 and V.32 bis modems. When used with such modems, the present invention avoids the need to perform retraining and equalization during changes in DAA operating temperature.

30 Claims, 3 Drawing Sheets

TEMPERATURE COMPENSATION FOR TRANS-HYBRID LOSS IN A MINIATURIZED DATA ACCESS ARRANGEMENT

This is a continuation of application Ser. No. 08/018,730 filed Feb. 17, 1993, now abandoned.

BACKGROUND OF THE INVENTION

1. Field of the Invention

The present invention relates generally to telephone equipment and particularly to data access arrangements (DAAs).

2. Background Art

Telephone systems were originally designed for voice communication. As new information technologies have emerged, methods have been devised to transmit other types of information over telephone lines. These methods have required the connection of other equipment besides the voice telephone set to the telephone line. Examples of such equipment include computer modems, facsimile ("fax") machines, answering machines, voice mail systems, phone patches, automatic number identification or "Caller ID" systems, and advanced telephone systems. The signals present within the above equipment often have different electrical characteristics than the signals that may be transmitted on a telephone line. Thus, an interface is required to connect such equipment to a telephone line and to translate between the equipment signals and the telephone line signals.

Traditionally, especially for computer modems, a DAA is used to connect equipment to a telephone line. A DAA is an electronic circuit that typically provides coupling, isolation, impedance matching, hybrid and sometimes amplification, filtering and control functions. Isolation refers to the separation of electrical signals present on the customer premises equipment (CPE) side of the DAA from those present on the telephone line or central office (CO) side of the DAA. Isolation is important to avoid damage to the equipment from voltages present on the telephone line, such as the central office battery voltage, inductive switching pulses, foreign electromotive force (EMF) and transients caused by electrical storms. Isolation is also required under Part 68 of the Federal Communications Commission (FCC) Rules to prevent damage to the public switched telephone network (PSTN) by equipment connected to it. However, the isolation should be provided in a manner that allows the desired signals to be communicated between the CPE side and the CO side of the DAA. Impedance matching refers to the adaptation of the electrical characteristics of the equipment to the intrinsic electrical characteristics of the telephone line. Impedance matching is important because it maximizes the efficiency of the transmission of signals along the telephone line. A hybrid refers to a device for splitting a bidirectional communication path into two unidirectional communication paths. A line carrying both the transmit side and the receive side of a conversation may be split into a transmit path and a separate receive path. A hybrid is important because it is often desirable to have a signal containing only the received signal without any interference from the transmitted signal. Amplification refers to increasing the amplitude of a transmitted or received signal. Amplification is important for matching the audio levels of the equipment and the telephone line and for compensating for line loss. Filtering refers to removing unwanted signals, especially unwanted high frequency signals, from the signals that pass through the DAA. Filtering is important to eliminate frequencies that might cause interference. Control refers to the selection of the status of the DAA and includes such parameters as on-hook/off-hook, gain and loopback.

One characteristic of a hybrid circuit is transhybrid loss. Transhybrid loss is the ratio of the amount of the transmit signal present in the bidirectional communication path to the amount of the transmitted signal present in the unidirectional receive signal path. Where the bidirectional path is a typical telephone line, transhybrid loss is the ratio of the amount of transmit signal present across the conductors of the telephone line to the amount of transmit signal present at the receive signal output. Ideally, none of the transmit signal should be present in the receive signal path, so a hybrid should have a high and stable transhybrid loss value.

DAAs have traditional been large and bulky. As computers become smaller and more portable, there is a need for smaller, more portable DAAs. Notebook and palmtop computers, for example, require a small, lightweight DAA for connection to a telephone line. A DAA contains certain parts that dissipate heat and other parts that are thermally sensitive. As the DAA size is reduced, the parts that dissipate heat must be placed closer to the thermally sensitive parts. The heat produced by the heat dissipating parts changes the performance of the thermally sensitive parts. Thus, a method is needed for reducing the thermal sensitivity of a DAA circuit for use in miniaturized applications.

The thermal sensitivity problem is exacerbated by the miniaturization of the individual components used to make a miniaturized DAA. A transformer is typically used to couple the equipment side of a DAA to the telephone line side of a DAA. To provide a miniaturized DAA, the transformer must be miniaturized. To miniaturize the transformer, the diameter of the wires used to wind the transformer must be reduced and the number of windings must be increased. A reduction of the diameter and cross sectional area of the wires results in an increased winding resistance. Adding more windings increases the winding resistance further. Since the wires used to wind a transformer have a considerable temperature coefficient of resistance and the wires have a higher winding resistance, heating of the transformer results in a significant increase in winding resistance.

When power is first applied to a circuit with a thermally sensitive transformer, the winding has not been heated and has a relatively low resistance value. As power remains applied and components of the circuit dissipate heat, the transformer is heated and its resistance increases. Thus, the increased winding resistance is not necessarily a static elevation of resistance, but may be a dynamic variation of resistance over temperature.

The application of power to the circuit may involve the application of supply voltage to the circuit, the initiation of telephone line loop current flow, the transition of components from a relatively quiescent state to a relatively active state, or other changes that increase power dissipation of components in the circuit.

Certain types of circuits are particularly sensitive to changes in resistance of circuit components. For example, a high speed modem, such as a CCITT V.32 modem, performs an equalization and training sequence when a connection is first established. The training sequence sets modem parameters to the proper values for the characteristics of the modems and communication lines being used. However, a change in transformer winding resistance over time can lead to a change in transhybrid loss. If the transhybrid loss comes to have a different value than it had during the training sequence, the modem parameters must be adjusted to compensate for the change in transhybrid loss. The modem performs another training sequence to attempt to retrain the modem to the new transhybrid loss value. Retraining requires time and delays the transmission of data. Thus, a temperature compensation method is needed to prevent variation of transhybrid loss with temperature.

Figure 1A:
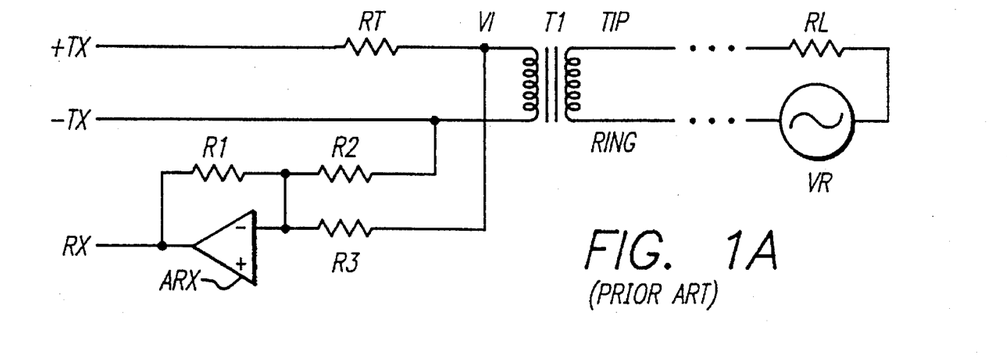
FIG. 1A is a schematic diagram illustrating a typical hybrid circuit having a traditional large low resistance transformer.

FIG. 1A illustrates a typical hybrid circuit using a traditional relatively large low resistance transformer. The first terminal of resistor RL is coupled to the TIP conductor. The second terminal of resistor RL is coupled to the first terminal of AC voltage source VR. The second terminal of AC voltage source VR is coupled to the RING conductor. The TIP conductor is coupled to the first terminal of the first winding of transformer T1. The RING conductor is coupled to the second terminal of the second winding of transformer T1.

Input +TX is coupled to the first terminal of resistor RT. The second terminal of resistor RT is coupled to node V1, which is coupled to the first terminal of the second winding of transformer T1 and to the first terminal of resistor R3. Input −TX is coupled to the second terminal of the second winding of transformer T1 and to the first terminal of resistor R2. The second terminal of resistor R2 is coupled to the second terminal of resistor R3, to the inverting input of amplifier ARX and to the first terminal of resistor R1. The second terminal of resistor R1 is coupled to the output of amplifier ARX and to output RX.

A differential transmit signal having a voltage equal to two times VTX is applied across inputs +TX and −TX. The signal passes through resistor RT and the second winding of transformer T1. Transformer T1 is a 1:1 matching and isolation transformer with input and output impedances typically in the 600–900 Ω range. Resistor RT has a value approximately equal to the impedance of the transmission line. Resistor RT is in series with the differential input +TX/−TX and provides a matching impedance of a nominal value of RL. With ideal components (including a transformer having zero winding resistance) and with RT equal to the transmission line impedance, the transmit signal has no effect on the voltage at node V1. However, under less than ideal transmission line conditions, the transmit signal across differential input +TX/−TX affects the voltage at node V1, but the echo canceller of a V.32 or other modem may be used to determine the amount of transmit signal present at node V1 and to provide for any signal processing needed to subtract the transmit signal present with the receive signal.

The voltage at node V1 is expressed as follows:

$$V1 = VTX - \frac{2 \cdot VTX \cdot RT}{RT + RL} + \frac{VR \cdot RT}{RT + RL} \quad (1)$$

assuming R3>>RT+RL.

Amplifier ARX and resistors R1, R2 and R3 form a summing amplifier circuit. The amplifier circuit produces a signal at output RX that is proportional to the difference between the voltage present at the non-inverting input of amplifier ARX and the sum of the voltages of node V1 and input −TX. Under ideal conditions where RT=RL, even if a transmit signal is present across inputs +TX and −TX, it is canceled out by the hybrid circuit so that it does affect the voltage at output RX, which is referred to as VRX.

When a transmit signal is applied across inputs +TX and −TX and is coupled to the second winding of transformer T1, transformer T1 inductively couples the desired AC signals from the second winding to the first winding while isolating any DC voltages, DC offsets and/or common mode voltages of the windings. Thus, the desired AC components of the transmit signal are applied across the TIP and RING conductors. The TIP and RING conductors represent a differential transmission line, preferably a twisted pair telephone line.

Voltage source VR represents the AC signal source at the opposite end of the telephone line, which is typically located at the telephone company central office. Resistor RL represents the resistance of the TIP and RING conductors summed with the source impedance of voltage source VR. A receive signal is represented by the variation of the voltage of voltage source VR. The differential receive signal is applied across the TIP and RING conductors and appears across the first winding of transformer T1. Transformer T1 passes the desired AC components of the receive signal from its first winding to its second winding while isolating any DC voltages, DC offsets and/or common mode signals. The receive signal across the second winding of transformer T1 appears across the inputs to the summing amplifier circuit. Although the summing amplifier circuit is adjusted to provide a zero voltage output when no receive signal is present, the presence of a receive signal across the inputs to the summing amplifier causes the summing amplifier to change its output voltage in response to the receive signal. Output RX tracks the receive signal and is not affected by a transmit signal, even if one is present. Thus, the hybrid separates the receive signal from the transmit signal and provides a receive signal output independent of any transmit signal. The hybrid allows both the transmit and receive signals to be transmitted along the TIP and RING conductors without interference from each other.

The voltage VRX has the following value:

$$VRX = V1\frac{R1}{R3} - VTX\frac{R1}{R2} \quad (2)$$

G1 and G2 can be defined as follows:

$$G1 = \frac{R1}{R3}$$

$$G2 = \frac{R1}{R2}$$

If G1 and G2 are substituted into equation (2) and equation (1) is substituted into equation (2), the following equation results:

$$VRX = \quad (3)$$

$$G1 \cdot VTX - \frac{G1 \cdot 2 \cdot VTX \cdot RT}{RT + RL} + \frac{G1 \cdot VR \cdot RT}{RT + RL} - G2 \cdot VTX$$

In equation (3), VTX can be eliminated if the following equation is satisfied:

$$G1 - \frac{G1 \cdot 2 \cdot RT}{RT + RL} - G2 = 0 \quad (4)$$

If VTX is eliminated, equation (3) can be rewritten as follows:

$$VRX = \frac{G1 \cdot VR \cdot RT}{RT + RL} \quad (5)$$

Figure 1B:
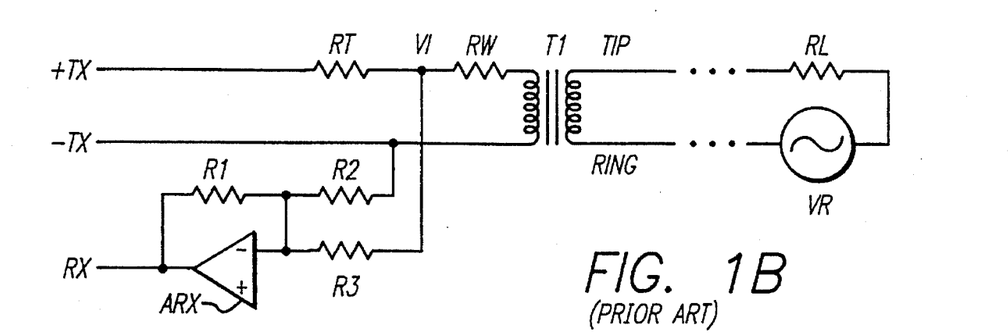
FIG. 1B is a schematic diagram illustrating a hybrid circuit having a high resistance transformer.

FIG. 1B illustrates a hybrid circuit constructed with a transformer having a high winding resistance, which can result from long windings and/or windings of small cross-sectional area. FIG. 1B is substantially identical to FIG. 1A except FIG. 1B has resistor RW inserted between node V1 and the first terminal of the second winding of transformer T1. Node V1 is coupled to the first terminal of resistor RW. The second terminal of resistor RW is coupled to the first terminal of the second winding of transformer T1.

Some transformers, particularly those with long windings and/or those wound with wire of small cross-sectional area, have significant winding resistance, represented by resistor RW. In telephony, return loss measures how well the impedance of CPE, such as a hybrid circuit, matches the nominal telephone line termination impedance. To optimize return loss, resistor RT is selected to have a value that, when added to winding resistance RW, equals the characteristic line impedance (typically 600 ohms for telephone lines). However, since the value of resistor RT no longer matches the characteristic line impedance, some of the transmit signal is present at node V1 even if the hybrid circuit is coupled to an ideal transmission line. To compensate for the attenuated +TX signal present at node V1, amplifier ARX is configured as a summing amplifier to add an attenuated version of signal from the −TX input to the signal from node V1. The sum of the attenuated +TX and −TX signals is zero, thereby eliminating any components of the transmit signal from node V1. Thus, only the receive signal is amplified by amplifier ARX.

With the proper component selection and the absence of drift in component values, the circuit of FIG. 1B can provide optimum transhybrid loss for a particular telephone line impedance. If the impedance of the transmission line is different than expected or if the component values (including the transformer winding resistance) change, the transhybrid loss changes.

Resistor RW is shown in series with the ideal second winding of transformer T1, but actually represents the significant DC resistance of the second winding since the second winding is not an ideal winding. The DC resistance of the winding is dependent upon the resistivity of the material of which the winding is constructed, its length, cross-sectional area and temperature. The resistivity, length and cross-sectional area are generally fixed under normal operation. The temperature, however, can and usually does vary. Often, certain components of a hybrid circuit dissipate substantial amounts of heat. To maintain a telephone line in an off-hook state, DAAs typically use a holding circuit or so-called "holding coil." The holding circuit allows DC current to pass, indicating to the telephone company central office that the telephone line is off hook. The holding circuit does not pass AC current, thus allowing other DAA components to receive and transmit AC signals without interference. The DC holding current is dependent upon the length of a telephone line from the central office, the type of cable used for the telephone line and the type of central office equipment. Typical phone lines in the United States provide about 40 mA of DC current. However, DC currents ranging from about 20 mA to about 120 mA may be expected. At 120 mA, a holding circuit typically drops about 15 volts across it, thereby dissipating about 1.8 watts of power. In a small DAA package, such dissipation may increase the temperature of the DAA circuitry by about 15 C. It often takes 15–20 minutes for such a DAA to reach a state of thermal equilibrium. Although the dissipation usually occurs in the holding circuit components, the temperature of the transformer windings may also increase, especially if located in close proximity. As the temperature of the windings changes, the resistance of the windings also changes. The temperature coefficient of the transformer winding resistance RW is typically about 4000 ppm/C. The temperature coefficient of resistor RT is typically much less than 4000 ppm/C. Since the transhybrid loss is a function of these resistors and since the resistors have greatly different temperature coefficients, the transhybrid loss of the DAA changes significantly as it warms up. Higher holding current levels cause more temperature rise, which results in greater transhybrid loss drift.

Transhybrid loss refers to the amount of transmit signal present at the receive signal output RX. The function of the hybrid is to minimize the amount of the transmit signal present at the receive signal output. Thus, the transhybrid loss should be minimized. Transformer winding resistance is one factor that can contribute to increased transhybrid loss. Although it is possible to compensate for the winding resistance, variations in transhybrid loss over time can impair communications. As transformer windings warm up and their resistance changes, the resulting changes in transhybrid loss can cause a reduction in signal to noise ratio. In CCITT V.32 data modems, transhybrid loss drift may cause data errors and may cause the modem to initiate a retraining sequence to adjust the equalization parameters to values suitable for the changed levels of transhybrid loss. Retraining requires time and reduces the throughput and reliability of the modem connection.

The voltage V1 of FIG. 1B is given by the following equation:

$$V1 = VTX - \frac{2 \cdot VTX \cdot RT}{RT + RW + RL} + \frac{VR \cdot RT}{RT + RW + RL} \quad (6)$$

The voltage VRX of FIG. 1B is given by the following equation:

$$VRX = G1 \cdot VTX - \quad (7)$$

$$\frac{G1 \cdot 2 \cdot VTX \cdot RT}{RT + RW + RL} + \frac{G1 \cdot VR \cdot RT}{RT + RW + RL} - G2 \cdot VTX$$

To minimize transhybrid loss, the following equation must be satisfied:

$$G1 \cdot VTX \left( 1 - \frac{2 \cdot RT}{RT + RW + RL} \right) - G2 \cdot VTX = 0 \quad (8)$$

However, since RW, which is dependent upon temperature, cannot be cancelled from equation (8), equation (8) cannot be satisfied at more than a single temperature using the circuit of FIG. 1B. Thus, the circuit of FIG. 1B cannot maintain an ideal transhybrid loss over a broad temperature range.

SUMMARY OF THE INVENTION

A method of temperature compensation for transhybrid loss drift is provided. The present invention allows a DAA to be miniaturized, avoiding the bulkiness and weight of prior art DAAs. The present invention compensates for variations in resistance of a transformer over temperature, thus maintaining constant transhybrid loss over time. By maintaining constant transhybrid loss, the present invention avoids modem retraining sequences and the resultant communication delays.

In the present invention, a temperature compensating device is placed at a position that lies along the same isothermal line as the transformer and is coupled into the circuit so as to compensate for thermal variations in component parameters. By compensating for variations in component parameters over temperature, stable transhybrid loss may be maintained.

In the preferred embodiment of the present invention, a thermistor is placed in proximity to the transformer on a ceramic substrate. The ceramic substrate provides good thermal conductivity and places the thermistor on the same isothermal line as the transformer. The thermistor is a positive temperature coefficient thick film resistor that is coupled to the hybrid circuitry so as to offset any change in the transformer winding resistance over temperature.

Initially, before power is applied to the DAA, the DAA components are at the ambient temperature. The initial transhybrid loss is determined by the component parameters at ambient temperature, including the transformer winding resistance and the thermistor resistance. After power is applied to the DAA, DAA components begin to dissipate heat. The dissipation increases the temperature of the transformer, causing an increase in transformer winding resistance. The dissipation also causes a corresponding increase in thermistor temperature and resistance. The DAA circuit is configured so that the increased thermistor resistance offsets the effects of the increased transformer winding resistance. Thus, the disadvantages of the prior art are overcome and the transhybrid loss and other DAA characteristics are stabilized over a broad temperature range.

DETAILED DESCRIPTION OF THE INVENTION

A method and apparatus for temperature compensation of transhybrid loss in a DAA is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

In the past, DAAs have traditionally been large, bulky and heavy. Such DAAs are incompatible with modern computer systems, such as laptop, notebook and palmtop computers. Miniaturized DAAs are difficult to produce because temperature sensitive components are placed closer to heat dissipating components, resulting in thermally degraded performance. Therefore, there is a need for a method of temperature compensation for DAAs that is compatible with miniaturized DAAs.

The present invention provides for a thermal compensation device to be placed in proximity to a thermally sensitive device so that as the thermally sensitive device is heated by power dissipating devices, the desired level of DAA performance is maintained independent of temperature. The thermal compensation device is coupled to the thermally sensitive device in a manner so as to offset any changes in circuit parameters resulting from the temperature dependencies of the thermally sensitive device.

The present invention allows a DAA to operate at different or changing ambient temperatures and throughout the temperature change associated with the initial temperature change of the DAA after power is applied. The present invention maintains constant DAA performance and avoids the need for modem retraining or reequalization during temperature changes.

Figure 2:
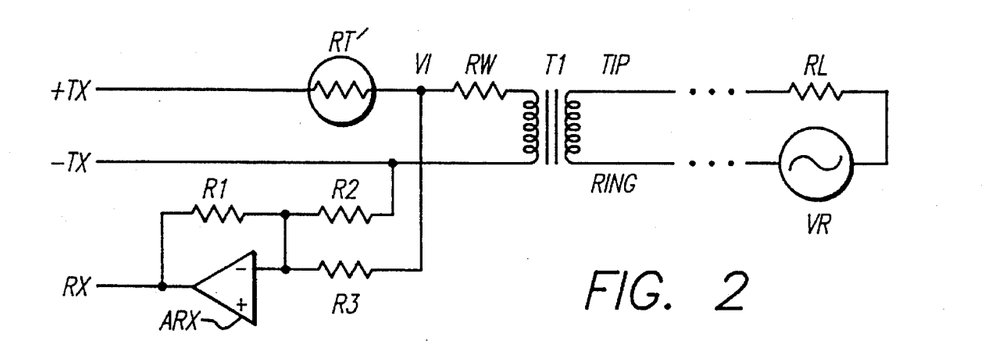
FIG. 2 is a schematic diagram illustrating the preferred embodiment of the hybrid circuit of the present invention.

FIG. 2 illustrates the preferred embodiment of the hybrid circuit of the present invention. The first terminal of resistor RL is coupled to the TIP conductor. The second terminal of resistor RL is coupled to the first terminal of AC voltage source VR. The second terminal of AC voltage source VR is coupled to the RING conductor. The TIP conductor is coupled to the first terminal of the first winding of transformer T1. The RING conductor is coupled to the second terminal of the second winding of transformer T1.

Input +TX is coupled to the first terminal of thermistor RT'. The second terminal of thermistor RT' is coupled to node V1, which is coupled to the first terminal of resistor RW and to the first terminal of resistor R3. The second terminal of resistor RW is coupled to the first terminal of the second winding of transformer T1. Input −TX is coupled to the second terminal of the second winding of transformer T1 and to the first terminal of resistor R2. The second terminal of resistor R2 is coupled to the second terminal of resistor R3, to the inverting input of amplifier ARX and to the first terminal of resistor R1. The second terminal of resistor R1 is coupled to the output of amplifier ARX and to output RX.

A differential transmit signal is applied across inputs +TX and −TX. The signal passes through thermistor RT' and resistor RW and also through the second winding of transformer T1. Transformer T1 is a 1:1 matching and isolation transformer with input and output impedances preferably in the 600–900 Ω range. Thermistor RT' has a value such that the sum of the resistance of thermistor RT' and winding resistance RW is approximately equal to the characteristic impedance of the transmission line that includes the TIP and RING conductors, which is nominally 600 Ω and is shown by resistor RL. Thermistor RT' is in series with the differential input +TX/−TX and, in sum with winding resistance RW, provides a matching impedance of a nominal value of RL, which represents the characteristic impedance of the transmission line.

Amplifier ARX and resistors R1, R2 and R3 form a summing amplifier circuit. The amplifier circuit produces a signal at output RX that is proportional to the difference between the voltage present at the non-inverting input of amplifier ARX and the sum of the voltages of node V1 and input −TX. Even if a transmit signal is present across inputs +TX and −TX, it is cancelled out by the hybrid circuit so that it does affect output RX.

When a transmit signal is applied across inputs +TX and −TX and is coupled to the second winding of transformer T1, transformer T1 inductively couples the desired AC signals from the second winding to the first winding while isolating any DC voltages, DC offsets and/or common mode signals of the windings. Thus, the desired AC components of the transmit signal are applied across the TIP and RING conductors. The TIP and RING conductors represent a differential transmission line, preferably a twisted pair telephone line.

Voltage source VR represents the AC signal source at the opposite end of the telephone line, which is typically located at the telephone company central office. Resistor RL represents the resistance of the TIP and RING conductors summed with the source impedance of voltage source VR. A receive signal is represented by the variation of the voltage of voltage source VR. The differential receive signal is applied across the TIP and RING conductors and appears across the first winding of transformer T1. Transformer T1 passes the desired AC components of the receive signal from its first winding to its second winding while isolating any DC voltages, DC offsets and/or common mode signals. The receive signal across the second winding of transformer T1 appears across the inputs to the summing amplifier circuit. Although the summing amplifier circuit is adjusted to provide a zero voltage output when no receive signal is present, the presence of a receive signal across the inputs to the summing amplifier causes the summing amplifier to change its output voltage in response to the receive signal. Output RX tracks the receive signal and is not affected by a transmit signal, even if one is present. Thus, the hybrid separates the receive signal from the transmit signal and provides a receive signal output independent of any transmit signal. The hybrid allows both the transmit and receive signals to be transmitted along the TIP and RING conductors without interference from each other.

The voltage at node V1 is expressed as follows:

$$V1 = VTX - \frac{2 \cdot VTX \cdot RT'}{RT' + RW + RL} + \frac{VR \cdot RT'}{RT' + RW + RL} \quad (9)$$

Voltage VRX is expressed as follows:

$$VRX = G1 \cdot VTX - \quad (10)$$
$$\frac{G1 \cdot 2 \cdot VTX \cdot RT'}{RT' + RW + RL} + \frac{G1 \cdot VR \cdot RT'}{RT' + RW + RL} - G2 \cdot VTX$$

To minimize transhybrid loss, components are selected to satisfy the following equation:

$$G1 \cdot VTX \left(1 - \frac{2 \cdot RT'}{RT' + RW + RL}\right) - G2 \cdot VTX = 0 \quad (11)$$

To avoid variations in transhybrid loss over temperature, the following expression must not vary over temperature:

$$\frac{2 \cdot RT'}{RT' + RW + RL} \quad (12)$$

However, RW represents the winding resistance of transformer T1, which has a significant temperature coefficient of resistance (approximately 4000 ppm/C). RL represents the characteristic impedance of the transmission line, which is difficult to change or adjust. Thus, to make expression (12) temperature invariant, RT' is made to vary with temperature at a rate that offsets the effect of the significant temperature coefficient of winding resistance RW.

The room temperature value of expression (12) is as follows:

$$\frac{2 \cdot RTN}{RTN + RWN + RL} \quad (13)$$

where room temperature is approximately 20 C. and where $$RT'=RT'N (1+\rho T' \cdot \Delta t), \quad (14)$$

$$RW=RWN(1+\rho W \cdot \Delta t), \quad (15)$$

RT'N=the room temperature resistance of thermistor RT',
RWN=the room temperature value of winding resistance RW,
ρT'=the temperature coefficient of thermistor RT',
ρW=the temperature coefficient of winding resistance RW and
Δt=the temperature difference relative to room temperature.

Thus, to ensure constant transhybrid loss over temperature, the following equation is to be satisfied for expected values of Δt:

$$\frac{2 \cdot RT'N(1 + \rho T' \Delta t)}{RT'N(1 + \rho T' \cdot \Delta t) + RWN(1 + \rho W \cdot \Delta t) + RL} = \quad (16)$$
$$\frac{2 \cdot RTN}{RTN + RWN + RL}$$

Solving equation (16) for ρT' gives the following equation:

$$\rho T' = \frac{\rho W \cdot RWN}{RWN + RL} \quad (17)$$

Although the preferred embodiment of the present invention uses a positive temperature coefficient thermistor, the present invention may also be practiced using a negative temperature coefficient thermistor, or a combination of fixed resistors and positive and/or negative temperature coefficient thermistors. Positive temperature coefficient thermistors are advantageous since they are available with linear resistance change over temperature. If other resistor/thermistor combinations are used, other circuit configurations may be necessary. For example, a negative temperature coefficient thermistor could be placed between node V1 and the first terminal of the second winding of transformer T1. Alternatively, resistors R1, R2 and/or R3 could be replaced with thermistors. Also, another alternative is to add thermistors at other points in the circuit where no resistors are presently located.

Figure 6:
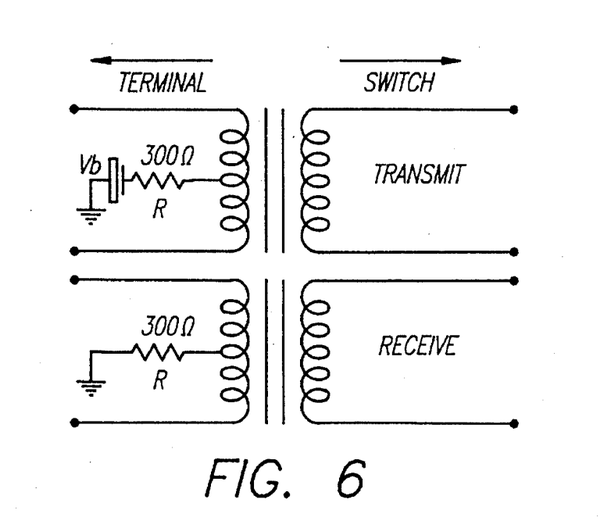
FIG. 6 is a diagram of an ISDN phantom power feeding arrangement.

Although the preferred embodiment may be used with analog telephone lines, the present invention is not limited to use with analog telephone lines. The present invention may also be used for temperature compensation of inductive devices having high winding resistances in other circuits. For example, the present invention may be used for temperature compensation of line transformers for coupling communications terminals to integrated services digital network (ISDN) lines. A phantom power feeding arrangement as described in CCITT I.430 and as illustrated in FIG. 6 is often used to supply power to an ISDN terminal over an S or T interface. Such a power feeding arrangement causes the battery voltage Vb to flow through the windings of the line transformers, which may result in heating of the transformer windings and changes in winding resistance. Winding resistance variations can alter transmission characteristics and impair communications. The present invention may be used to compensate for variations in winding resistance, thereby maintaining reliable communications. The present invention may be practiced on either the terminal or the switch side of the S or T interface.

The present invention may also be practiced with an ISDN U interface. The U interface is a 2-wire interface with both the transmit and receive signals transmitted over the same cable pair. Since the transmit and receive signals are separated at an NT1 device or U interface terminal, a hybrid function is needed. If a thermally sensitive component, such as a line transformer, changes temperature, the transhybrid loss may change. The present invention may be used to maintain constant transhybrid loss. The present invention may be practiced at the terminal or switch side of a U interface. The present invention may be practiced at the S or T side and at the U side of an NT1 device.

The present invention may also be practiced with local area networks (LANs). The present invention may be used to maintain constant transhybrid loss or to compensate for thermally sensitive components in LANs.

Figure 3:
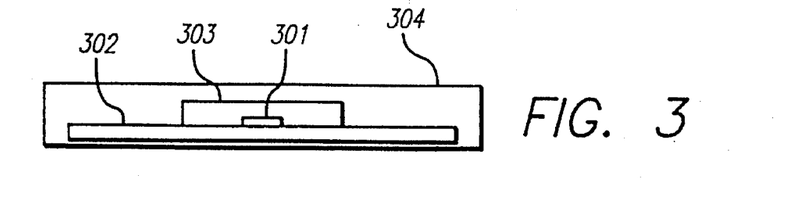
FIG. 3 is a cross-sectional view of the preferred embodiment of the present invention.

FIG. 3 illustrates a cross-sectional view of an embodiment of the present invention. Thermal compensation device 301 is mounted or constructed on substrate 302. Thermally sensitive device 303 is mounted in close proximity to thermal compensation device 301, preferably directly over it and in contact with it. Thermal compensation device 301, substrate 302 and thermally sensitive device 303 may be encapsulated within encapsulation material 304. Alternatively, thermal compensation device 301, substrate 302 and thermally sensitive device 303 may be left unencapsulated. Substrate 302 may be a ceramic substrate, a fiberglass composite substrate, a printed circuit (PC) board or another material having suitable structural properties.

If the circuit of FIG. 2 is constructed according to FIG. 3, resistor RT', which may be represented as thermal compensation device 301, may be mounted or constructed on substrate 302 and transformer T1, which may be represented as thermally sensitive device 303, may be mounted over or near resistor RT' so that thermal compensation device 301 and thermally sensitive device 303 are on an isothermal line. The assembly may be overmolded with a material such as polyvinyl chloride (PVC) or any other suitable material as encapsulation material 304, or the encapsulation material may be omitted.

By placing thermal compensation device 301 in close proximity to thermally sensitive device 303 on substrate 302, thermal compensation device 301 and thermally sensitive device 303 may be maintained on the same isothermal line or contour. By maintaining an isothermal relationship between the parts, temperature differences between the parts can be avoided and the compensation provided by thermal compensation device 301 can more closely track the temperature dependencies of thermally sensitive device 303. While the encapsulation material 304 may lead to increased temperature rises for the DAA circuitry by acting as thermal insulation, encapsulation material 304 also physically protects the DAA circuitry and helps reduce any temperature differences between thermal compensation device 301 and thermally sensitive device 303.

Figure 4:
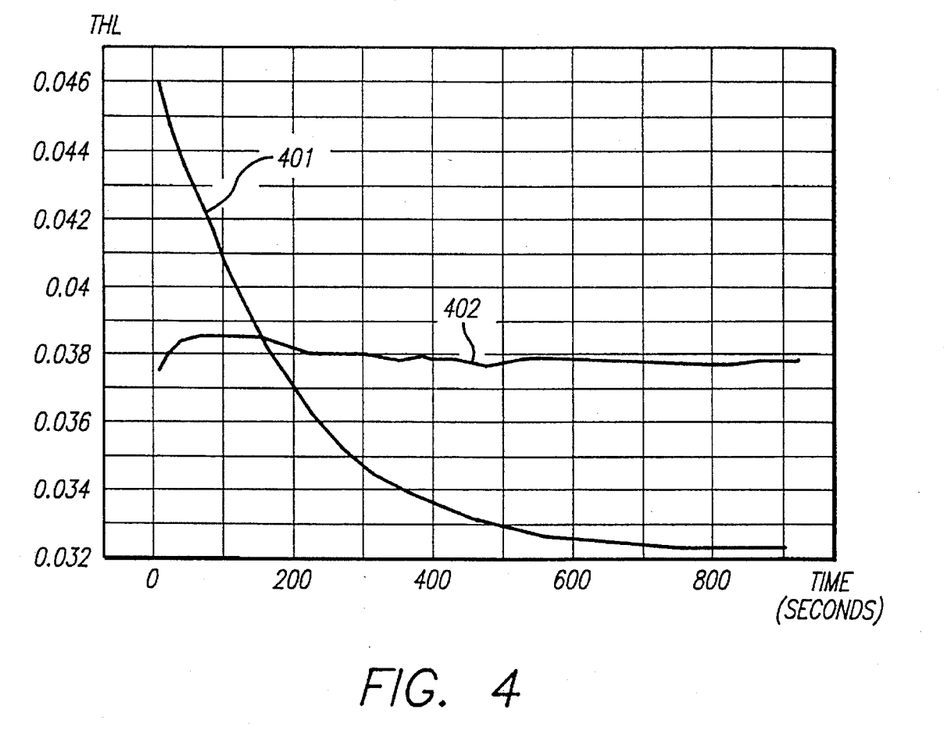
FIG. 4 is a graph illustrating transhybrid loss over time for a prior art hybrid circuit and for a hybrid circuit constructed according to the present invention.

FIG. 4 illustrates the change in transhybrid loss over time in a uncompensated hybrid circuit and in a thermally compensated hybrid circuit constructed according to the present invention from an initial power-up state to a operating steady state with a holding current of about 90 mA. The time axis is measured in seconds. Time=0 represents the point in time at which power is first applied to hybrid circuits, the components of which have been at an ambient temperature. As time progresses from 0 to 800, the hybrid circuits dissipate heat. The transhybrid loss of the uncompensated hybrid circuit is illustrated by curve 401 and changes from near 0.046 at time=0 to near 0.032 at time=800. The transhybrid loss of the thermally compensated hybrid circuit constructed according to the present invention is illustrated by curve 402, which starts near 0.0375 at time=0, remains relatively constant over time and, at time=800, has a value near 0.038. Thus, the thermally compensated hybrid circuit avoids the transhybrid loss drift of the uncompensated hybrid circuit.

Figure 5:
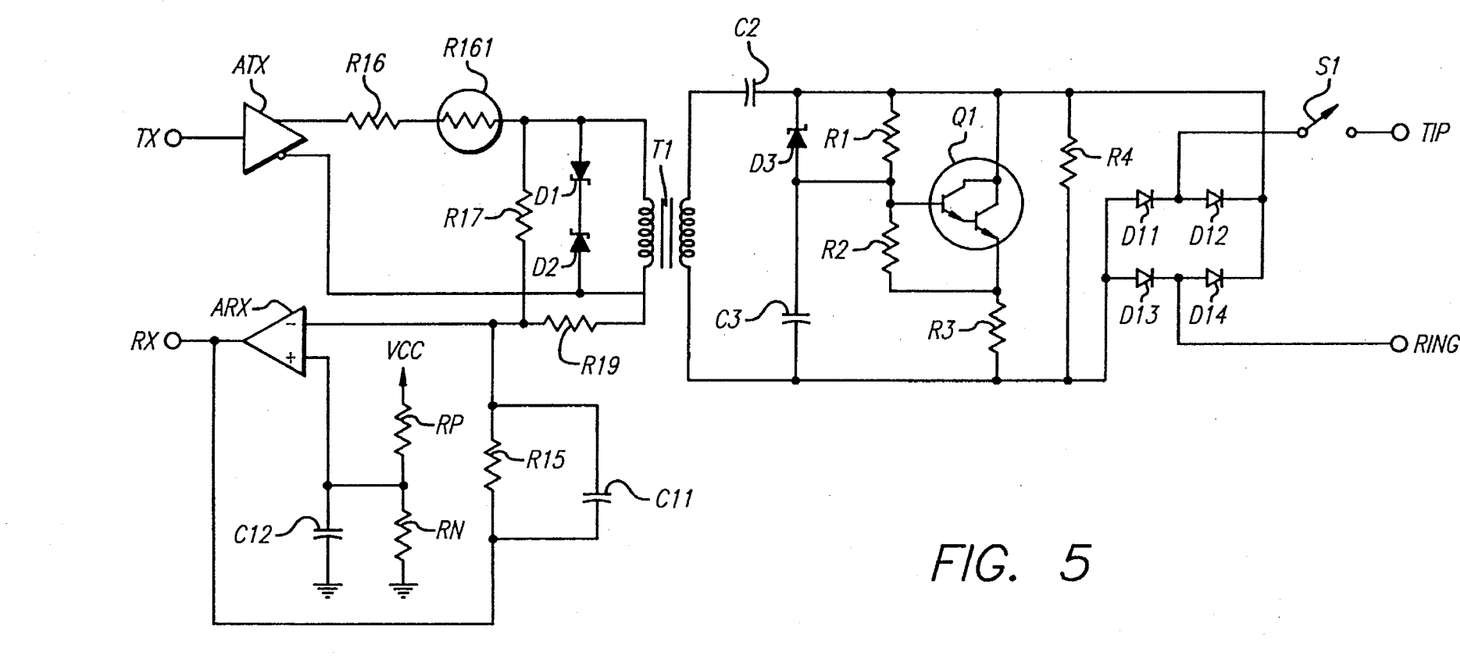
FIG. 5 is a detailed schematic diagram illustrating the preferred embodiment of the hybrid circuit of the present invention.

FIG. 5 illustrates a hybrid circuit constructed according to the present invention. The TIP conductor is coupled to the first terminal of hookswitch S1. The second terminal of hookswitch S1 is coupled to the cathode of diode D11 and to the anode of diode D12. The RING conductor is coupled to the cathode of diode D13 and to the anode of diode D14. The cathodes of diodes D12 and D14 are coupled to each other and to the first terminal of resistor R4, the collector terminal of NPN Darlington transistor Q1, to the first terminal of resistor R1, to the cathode of zener diode D3 and to the first terminal of capacitor C2. The second terminal of capacitor C2 is coupled to the first terminal of the first winding of transformer T1. The second terminal of resistor R1 is coupled to the first terminal of resistor R2, to the base terminal of NPN Darlington transistor Q1, to the anode of zener diode D3 and to the first terminal of capacitor C3. The second terminal of resistor R2 is coupled to the emitter terminal of NPN Darlington transistor Q1 and to the first terminal of resistor R3. The anodes of diodes D11 and D13 are coupled to each other and to the second terminal of resistor R4, to the second terminal of resistor R3, to the second terminal of capacitor C3 and to the second terminal of the first winding of transformer T1.

Input TX is coupled to the input of amplifier ATX. The non-inverting output of amplifier ATX is coupled to the first terminal of resistor R16. The second terminal of resistor R16 is coupled to the first terminal of thermistor R161. The second terminal of thermistor R161 is coupled to the first terminal of resistor R17, to the anode of zener diode D1 and to the first terminal of the second winding of transformer T1. The cathode of zener diode D1 is coupled to the cathode of zener diode D2. The inverting output of amplifier ATX is coupled to the anode of zener diode D2, to the second terminal of the second winding of transformer T1 and to the first terminal of resistor R19.

The second terminal of resistor R19 is coupled to the second terminal of resistor R17, to the first terminal of resistor R15, to the first terminal of capacitor C11 and to the inverting input of amplifier ARX. Supply voltage VCC is coupled to the first terminal of resistor RP. The second terminal of resistor RP is coupled to the first terminal of resistor RN, to the first terminal of capacitor C12 and to the noninverting input of amplifier ARX. The second terminal of resistor RN is coupled to ground. The second terminal of capacitor C12 is coupled to ground. The second terminal of resistor R15 is coupled to the second terminal of capacitor C11, to the output of amplifier ARX and to output RX.

A transmit signal is applied to input TX. The signal is amplified by amplifier ATX and passes through resistor R16 and thermistor R161 and also through the second winding of transformer T1. Transformer T1 is a 1:1 matching and isolation transformer with input and output impedances selected to match the transmission line impedance (preferably in the 600–900 Ω range). The sum of the resistances of resistors R16 and R161 is approximately equal to the characteristic impedance of the transmission line connected to terminals TIP and RING minus any winding resistance of transformer T1. Back-to-back zener diodes D1 and D2 are coupled across the second winding of transformer T1 to clamp any excessive voltages, such as spikes of noise, and to maintain a limit on the amplitude of the signal across the second winding of transformer T1.

Amplifier ARX and resistors R17, R19, R15, RP and RN, along with capacitors C11 and C12, form a summing amplifier circuit. The amplifier circuit produces a signal at output RX that is dependent upon the voltage present at the noninverting input of amplifier ARX and the voltages across the second winding of transformer T1. The voltage at the noninverting input of amplifier ARX is set by a voltage divider that includes resistors RP and RN. Capacitor C12 is suppresses transients in supply voltage VCC. By selecting the appropriate values for resistors R17 and R19, the voltage at output RX can be made to be zero when no receive signal is present. Even if a transmit signal is present across inputs +TX and −TX, it is cancelled out by the hybrid circuit so that it does affect output RX.

When a transmit signal is applied to input TX, it is amplified by amplifier ATX and delivered across the differential output of amplifier ATX. The transmit signal is coupled through resistor R16 and thermistor R161 to the second winding of transformer T1. Transformer T1 inductively couples the desired AC signals from the second winding to the first winding while isolating the DC voltages, DC offsets and/or common mode signals of the windings. The transmit signal is AC coupled through capacitor C2 to the bridge rectifier that includes diodes D11, D12, D13 and D14. The transmit signal is coupled through the bridge rectifier and through hookswitch S1, which is closed during communication, to the TIP and RING conductors. Thus, the desired AC components of the transmit signal are applied across the TIP and RING conductors. The TIP and RING conductors represent a differential transmission line, preferably a twisted pair telephone line.

Voltage source VR represents the AC signal source at the opposite end of the telephone line, which is typically located at the telephone company central office. Resistor RL represents the resistance of the TIP and RING conductors summed with the source impedance of voltage source VR. A receive signal is represented by the variation of the voltage of voltage source VR. The differential receive signal is applied across the TIP and RING conductors, passes through the bridge rectifier and through capacitor C2 and appears across the first winding of transformer T1. Transformer T1 passes the desired AC components of the receive signal from its first winding to its second winding while isolating any DC voltages, DC offsets and/or common mode signals. The receive signal across the second winding of transformer T1 appears across the inputs to the summing amplifier circuit. Although the summing amplifier circuit is adjusted to provide a zero voltage output when no receive signal is present, the presence of a receive signal across the inputs to the summing amplifier causes the summing amplifier to change its output voltage in response to the receive signal. Output RX tracks the receive signal and is not affected by a transmit signal, even if one is present. Thus, the hybrid separates the receive signal from the transmit signal and provides a receive signal output independent of any transmit signal. The hybrid allows both the transmit and receive signals to be transmitted along the TIP and RING conductors without interference from each other.

The voltage across the second winding of transformer T1 is expressed as follows:

$$VTX = \frac{2 \cdot VTX \cdot (R16 + R161)}{R16 + R161 + RW + RL} + \frac{VR \cdot (R16 + R161)}{R16 + R161 + RW + RL} \quad (18)$$

assuming R17>>R16+R161+RW+RL, where RW is the parasitic winding resistance of transformer T1.

Voltage VRX is expressed as follows:

$$VRX = G1 \cdot VTX - \frac{G1 \cdot 2 \cdot VTX \cdot (R16 + R161)}{R16 + R161 + RW + RL} + \quad (19)$$

$$\frac{G1 \cdot VR \cdot (R16 + R161)}{R16 + R161 + RW + RL} - G2 \cdot VTX$$

To minimize transhybrid loss, components are selected to satisfy the following equation:

$$G1 \cdot VTX \left(1 - \frac{2 \cdot (R16 + R161)}{(R16 + R161) + RW + RL}\right) - G2 \cdot VTX = 0 \quad (20)$$

To avoid variations in transhybrid loss over temperature, the following expression must not vary over temperature:

$$\frac{2 \cdot (R16 + R161)}{(R16 + R161) + RW + RL} \quad (21)$$

However, RW represents the winding resistance of transformer T1, which has a significant temperature coefficient of resistance (approximately 4000 ppm/C). RL represents the characteristic impedance of the transmission line, which is difficult to change or adjust. Thus, to make expression (21) temperature invariant, RT' is made to vary with temperature at a rate which offsets the effect of-the significant temperature coefficient of winding resistance RW.

The room temperature value of expression (21) is as follows:

$$\frac{2 \cdot (R16 + R161N)}{R16 + R161N + RWN + RL} \quad (22)$$

where $$R161 = R161N (1+\rho 161 \cdot \Delta t), \quad (23)$$

$$RW = RWN(1+\rho W \cdot \Delta y), \quad (24)$$

R161N=the room temperature resistance of thermistor R161,

RWN=the room temperature value of winding resistance RW,

ρ161=the temperature coefficient of thermistor R161,

ρW=the temperature coefficient of winding resistance RW and

Δt=the temperature difference relative to room temperature.

Thus, to ensure constant transhybrid loss over temperature, the following equation is to be satisfied for expected values of Δt:

$$\frac{2 \cdot (R16 + R161N(1 + \rho 161 \Delta t))}{R16 + R161N(1 + \rho 161 \cdot \Delta t) + RWN(1 + \rho W \cdot \Delta t) + RL} = \quad (25)$$

$$\frac{2 \cdot (R16 + R161N)}{R16 + R161N + RWN + RL}$$

$$R16 + R161 = RTN(1 + \rho T \cdot \Delta t) \quad (26)$$

Substituting equation (26) into equation (25) and solving for ρT' gives the following equation:

$$\rho T = \frac{\rho W \cdot RWN}{RWN + RL} \quad (27)$$

Ideally, the preferred embodiment is practiced with a single thermistor having a temperature coefficient of ρT' as given by equation (17). However, it is often difficult to produce thermistors having arbitrary temperature coefficients since the temperature coefficient is intrinsic to the material used to fabricate the thermistor. To achieve a precise temperature coefficient, a thermistor having a temperature coefficient greater than the desired value may be used in conjunction with a zero or low temperature coefficient resistor. FIG. 5 shows thermistor R161 used in conjunction with resistor R16. The sum of the resistance of resistor R16 and thermistor 11161 should be equal to the characteristic transmission line impedance minus any transformer winding resistance, as shown by the following equation:

$$R16 + R161 = RL - RW \quad (28)$$

However, since R161 is a thermistor, its resistance value is a function of temperature as given by the following equation:

$$R16+R161=R16+R161N\,(1+\rho 161\cdot \Delta t) \quad (29)$$

where R161N is the resistance of thermistor R161 at room temperature, ρ161 is the temperature coefficient of thermistor R161 and Δt is the difference in temperature between the temperature of thermistor R161 and room temperature.

Equation (29) can be rewritten as follows:

$$R16+R161=(R16+R161N)\left(1+\frac{R161N}{R16+R161N}\,\rho 161\cdot \Delta t\right) \quad (30)$$

Thus, the effective temperature coefficient of the combination of resistor R16 and thermistor R161 is as follows:

$$\rho T = \frac{R161N}{R16+R161N}\,\rho 161 \quad (31)$$

Thus, a method of temperature compensation for transhybrid loss in a DAA has been provided.

I claim:

1. A circuit comprising:
   a transformer having a first winding, said first winding having a first winding resistance, said first winding resistance having a first temperature coefficient of resistance;
   a thermocompensating element coupled to said transformer for providing thermal compensation of transhybrid loss;
   a transmit signal input coupled to said first winding of said transformer for applying a transmit signal to said transformer; and
   a receive amplifier circuit coupled to said first winding of said transformer, said receive amplifier circuit for outputting a receive signal, said receive signal being independent of said transmit signal.

2. The circuit of claim 1 wherein said thermocompensating element comprises a thermistor, said thermistor having a second temperature coefficient of resistance and a thermistor room temperature resistance at a room temperature.

3. The circuit of claim 2 wherein said circuit comprises a telephone hybrid circuit.

4. The circuit of claim 3 wherein said receive amplifier circuit has a first input coupled to a first terminal of said transformer and a second input coupled to a second terminal of said transformer.

5. The circuit of claim 4 wherein said receive amplifier circuit comprises a summing amplifier circuit for amplifying a combination of a first input signal present at said first input and a second input signal present at said second input.

6. The circuit of claim 2 wherein said thermistor is in series with said first winding of said transformer.

7. The circuit of claim 6 further comprising a resistor having a second resistance and a third temperature coefficient of resistance approximately equal to zero, wherein said resistor is configured in series with said thermistor.

8. The circuit of claim 7 further comprising a transmission line coupled to a second winding of said transformer, said second winding having a second winding resistance, wherein ρW=said first temperature coefficient of resistance;
RWN=said first winding resistance+said second winding resistance;
RL=a characteristic impedance of said transmission line;
ρT=an effective temperature coefficient of the combination of said thermocompensating element and said resistor, and;

$$\rho T = \frac{\rho W \cdot RWN}{RWN+RL}$$

9. The circuit of claim 8 wherein
ρ161=said second temperature coefficient of resistance;
R161N=said thermistor room temperature resistance;
R16=said second resistance, and;

$$\rho T = \frac{R161N}{R16+R161N}\,\rho 161,$$

wherein said thermistor and said resistor cooperatively compensate for thermal changes of said first and second winding resistances.

10. The circuit of claim 2 wherein said thermistor is mounted on an isothermal line with said transformer.

11. The circuit of claim 10 wherein said thermistor and said transformer are mounted on a ceramic substrate.

12. The circuit of claim 10 wherein said thermistor and said transformer are mounted on a fiberglass composite substrate.

13. The circuit of claim 2 wherein said circuit comprises an ISDN interface circuit.

14. The circuit of claim 2 wherein said circuit comprises a LAN interface.

15. A telephone hybrid circuit comprising:
   a transformer having a first winding and a second winding for isolating a telephone line from user equipment;
   a hookswitch for selectively coupling said transformer to said telephone line;
   a receive amplifier coupled to said second winding of said transformer for amplifying a receive signal;
   a thermistor coupled to said second winding of said transformer for compensating for a thermal dependency of said transformer;
   a transmit signal input coupled to said second winding of said transformer for providing a transmit signal.

16. The circuit of claim 15 further comprising a resistor having a nominal zero temperature coefficient of resistance coupled to said thermistor for matching a thermistor temperature coefficient of resistance to a transformer temperature coefficient of resistance.

17. A circuit comprising:
   an isolation transformer having a first winding and a second winding, said first winding having a first winding resistance, said first winding resistance having a first temperature coefficient of resistance, said isolation transformer for providing isolation of DC voltages between said first winding and said second winding;
   a thermocompensating element coupled to said isolation transformer for providing thermal compensation of transhybrid loss;
   a capacitor in series with said second winding of said isolation transformer for coupling said second winding of said isolation transformer to a subscriber telephone line;
   a summing amplifier circuit coupled to said first winding of said isolation transformer for amplifying a signal from said subscriber telephone line.

18. The circuit of claim 17 wherein said thermocompensating element comprises a thermistor, said thermistor having a second temperature coefficient of resistance and a thermistor room temperature resistance at a room temperature.

19. The circuit of claim 18 wherein said circuit comprises a telephone hybrid circuit.

20. The circuit of claim 19 further comprising a receive amplifier circuit having a first input coupled to a first terminal of said isolation transformer and a second input coupled to a second terminal of said isolation transformer.

21. The circuit of claim 20 wherein said receive amplifier circuit comprises a summing amplifier circuit for amplifying a combination of a first input signal present at said first input and a second input signal present at said second input.

22. The circuit of claim 18 wherein said thermistor is in series with said first winding of said isolation transformer.

23. The circuit of claim 22 further comprising a resistor having a second resistance and a third temperature coefficient of resistance approximately equal to zero, wherein said resistor is configured in series with said thermistor.

24. The circuit of claim 23 further comprising a transmission line coupled to said second winding of said isolation transformer, said second winding having a second winding resistance, wherein $\rho W$=said first temperature coefficient of resistance;

RWN=said first winding resistance+said second winding resistance;

RL=a characteristic impedance of said transmission line;

$\rho T$=an effective temperature coefficient of the combination of said thermocompensating element and said resistor, and;

$$\rho T = \frac{\rho W \cdot RWN}{RWN + RL}.$$

25. The circuit of claim 24 wherein $\rho 161$=said second temperature coefficient of resistance;

R161N=said thermistor room temperature resistance;

R16=said second resistance, and;

$$\rho T = \frac{R161N}{R16 + R161N} \rho 161,$$

wherein said thermistor and said resistor cooperatively compensate for thermal changes of said first and second winding resistances.

26. The circuit of claim 18 wherein said thermistor is mounted on an isothermal line with said isolation transformer.

27. The circuit of claim 26 wherein said thermistor and said isolation transformer are mounted on a ceramic substrate.

28. The circuit of claim 26 wherein said thermistor and said isolation transformer are mounted on a fiberglass composite substrate.

29. The circuit of claim 18 wherein said circuit comprises an ISDN interface circuit.

30. The circuit of claim 18 wherein said circuit comprises a LAN interface.

* * * * *